United States Patent
Yoshiba et al.

[11] Patent Number: 5,776,545
[45] Date of Patent: Jul. 7, 1998

[54] NOZZLE COATING METHOD AND EQUIPMENT

[75] Inventors: Hiroshi Yoshiba, Funabashi; Yoichiro Ohashi, Nakano-ku; Kazuo Watanabe, Shiki; Kazuyuki Shiozaki, Kawagoe, all of Japan

[73] Assignee: Dai Nippon Printing Co., Ltd., Tokyo, Japan

[21] Appl. No.: 717,348

[22] Filed: Sep. 20, 1996

[30] Foreign Application Priority Data

Sep. 22, 1995 [JP] Japan .................. 7-244436

[51] Int. Cl.$^6$ .................. B05D 3/12; B05D 1/02
[52] U.S. Cl. .................. 427/356; 427/64; 427/165; 427/168; 427/421; 118/323
[58] Field of Search .................. 427/421, 165, 427/168, 64, 355, 356; 118/323

[56] References Cited

U.S. PATENT DOCUMENTS

| | | | |
|---|---|---|---|
| 5,037,723 | 8/1991 | Hwang | 430/320 |
| 5,116,704 | 5/1992 | Kwon | 430/3 |
| 5,348,585 | 9/1994 | Weston | 118/305 |
| 5,455,063 | 10/1995 | Jo | 427/64 |
| 5,460,653 | 10/1995 | Otani et al. | 118/668 |

OTHER PUBLICATIONS

"Denshi–Zairy\0(o,–)", Electronics and Materials, 1983.

*Primary Examiner*—Shrive Beck
*Assistant Examiner*—Michael Barr
*Attorney, Agent, or Firm*—Oliff & Berridge, PLC

[57] ABSTRACT

A method and an equipment in which a comparatively thick film such as the barrier rib of a plasma display panel is formed by one time of coating process. According to the nozzle coating equipment (10), a coating line (21A) is formed in such a way that, while a coating solution is being discharged from the tip of a nozzle (20) which is provided at the lower end of a liquid vessel (18) filled with the coating solution, the liquid vessel (18) carrying the nozzle (20) is driven in an X-direction relatively to a glass plate (16). Subsequently, the liquid vessel (18) is shifted in a Y-direction to the amount of a pitch P which is smaller than the width of each coating line, whereupon the next coating line (21B) is formed. Thus, a coated surface (22) is formed on the glass plate (16) in such a manner that the adjacent coating lines overlap each other in the widthwise direction thereof in succession.

7 Claims, 7 Drawing Sheets

NOZZLE COATING METHOD AND EQUIPMENT

BACKGROUND OF THE INVENTION

1. Field of the Invention

The present invention relates to a method of and an equipment for coating a plate or the like with a coating solution which is discharged from a nozzle. More particularly, it relates to a nozzle coating method and equipment which are well suited for application to the formation of the barrier rib of a plasma display panel.

2. Description of the Related Art

A plasma display panel which is a gas discharge panel, has a large number of cells which are sandwiched in between two glass plates and each of which functions as a minute electric discharge space. Each of the cells forms a picture element of predetermined color in such a way that light is emitted by electric discharge or that a phosphor is caused to fluoresce by ultraviolet radiation generated through electric discharge.

The minute cells are isolated from one another by a barrier rib or partition in order to prevent the crosstalk of light among the individual cells and to hold constant the spacing or gap between the glass plates.

In the plasma display panel, the barrier rib surrounding each discharge space is required to rise vertically and to be narrow and high, with the intentions of enlarging the discharge space to the utmost and attaining the light emission or fluorescence at a high intensity. Especially in a display panel of high definition, the barrier rib needs to have a high aspect ratio of, for example, a width of 30–50 [μm] to a height of 100 [μm].

As a method of forming the barrier rib in the plasma display panel as stated above, there has heretofore been a patterning process which is based on screen printing.

In accordance with the screen printing, the thickness of a film which can be formed by one time of printing is, at most, several tens [μm]. It is therefore necessary for attaining a desired film thickness (i. e., a desired barrier rib height) to repeat printing and drying a large number of times, in general, ten times or so.

Besides, the coating film which is formed by the screen printing becomes concave at its peripheral part and convex at its central part. This incurs the problem that, in the case of overprinting the coating films the large number of times, the slack cross-sectional shapes thereof are inevitably accumulated to spread the bottom part of a finished film. It is therefore limited to fine the pitch of the barrier rib (in other words, to realize the high definition of the display panel). Furthermore, the precision of the pitch is limited due to the distortion of the form plate of the screen printing. It is eventually difficult to enlarge the size of the display panel.

As a solution to such problems, a barrier rib forming method which utilizes a subtractive process has been proposed in, for example, "Denshi-Zairy\O (0,-)" (Electronics and Materials), No. 11, p. 138 (published in 1983).

This method is such that, after a barrier rib forming layer has been deposited on a plate, it is overlaid with a resist pattern for the subtractive process by printing or photolithography, whereupon a barrier rib forming material is-removed in correspondence with the openings of a resist in the resist pattern.

Herein, it is admitted that so-called "sandblasting" is well suited as one of expedients for the removal. In the sandblasting, the barrier rib material is physically etched by jetting fine grains mixed in compressed air, at high velocity. This expedient is capable of working the barrier rib material into the desirable shape in which the wall of a barrier rib rises vertically and is narrow and high. Further, when the photolithography is adopted for patterning the resist, there are the merits that the precision of the pattern can be heightened and that the size of a panel can be enlarged.

In the case where the barrier rib is worked by the sandblasting as explained above, the barrier rib forming layer which is not baked yet needs to be first deposited at a film thickness which is uniform over the whole surface of the glass plate within the effective display area of the panel.

Heretofore, the barrier rib forming layer has been deposited in such a way that the barrier rib forming material turned into ink is directly applied onto the glass plate by blade coating or by multilayer printing based on the screen printing.

The multilayer screen printing, however, is inferior in productivity because the steps of allover printing or smearing—subsequent drying are usually repeated five—ten times. Another problem is that ruggedness appears in the surface of the coating film due to the loose texture of raw silk cloth which is used in the printing.

In addition, a glass plate which is produced by floating and which is not polished is usually used in the plasma display panel. Therefore, the glass plate involves a dispersion of or above 20 [μm] in its plate thickness. When the barrier rib forming material is applied onto the glass plate by a coating process such as the blade coating or roll coating, the thickness of the coating film is affected by the thickness of the glass plate. It is accordingly difficult to deposit the barrier rib forming layer having the uniform film thickness.

Further, the film thickness of the barrier rib forming layer after having been dried is as great as 150 [μm]–200 [μm]. This incurs the problem that the framing of the peripheral part of the barrier rib forming layer attributed to the drying step is difficult to be eliminated merely by one time of application, and that the elimination of the framing necessitates to apply the barrier rib forming material a plurality of number of times even with the coating process.

Still further, in order to execute the patterning, alignment marks necessary for registration at the step of exposing the resist to light must be kept denuded without being covered with the barrier rib forming layer. It is therefore desirable to deposit the barrier rib forming layer in the state in which a non-coated area is left at the outer peripheral part of the glass plate. It is very difficult, however, to perform such an applying operation with any process other than the screen printing, for example, the coating process.

SUMMARY OF THE INVENTION

The present invention has been made in view of the problems of the prior art as stated above, and has for its object to provide a nozzle coating method and equipment according to which a coated surface having a required film thickness and involving little surface ruggedness to exhibit uniformity in the film thickness up to the peripheral part of the coated surface can be formed in only a required area by one time of coating.

Another object of the present invention is to provide a nozzle coating method and equipment according to which the single equipment can be used for coating without any alteration even when the size of a glass plate or the like has changed, and only a part of a glass plate or the like can be coated with a pattern without masking or the like.

In a typical aspect of performance of the present invention, the above objects are accomplished by a nozzle coating method comprising the step of coating a planar surface to-be-coated of a workpiece with a coating solution in parallel coating lines in such a way that a nozzle is moved relatively to and in parallel with the surface to-be-coated while the coating solution is being discharged from a tip of the nozzle in a state in which the nozzle tip is spaced from the surface to-be-coated, and the step of iteratively coating the surface to-be-coated in succession in such a manner that a part of a next coating line in a widthwise direction thereof overlaps the previous coating line in the widthwise direction, thereby to form a coated surface.

Herein, a gap between the surface to-be-coated and the nozzle tip may well be set substantially equal to a desired film thickness of the coated surface.

Further, a gap between the surface to-be-coated and the nozzle tip may well be set larger than a desired film thickness of the coated surface, and the coating lines are formed by the use of the coating solution which dangles in the shape of a thread from the nozzle.

More Further, a gap between the surface to-be-coated and the nozzle tip may well be set smaller than a desired film thickness of the coated surface.

Further, the discharge of the coating solution from the nozzle tip may well be suspended while the nozzle is shifted from a terminating end of one of the coating lines to an initiating end of a next one of the coating lines.

Still further, a widthwise pitch of the coating lines may well be set depending upon a diameter of a discharge port of the nozzle, a discharge pressure of the coating solution at the discharge port, and properties of the coating solution including a viscosity and a surface tension.

Yet further, the nozzle and at least one other nozzle may well be so arranged that the plurality of nozzles are spaced at a predetermined interval which is integral times a widthwise pitch of the coating lines, in the widthwise direction of the coating lines, and the surface to-be-coated may well be coated by moving the individual nozzles relatively thereto in such a manner that a first one of the coating lines based on a certain one of the individual nozzles and a last one of the coating lines based on another of the individual nozzles adjoining the certain nozzle rearward of the certain nozzle in the widthwise pitch feed direction thereof overlap each other in the widthwise direction.

It is also allowed that the coating solution contains a solvent, and that the coated surface is let stand in a temperature environment for a predetermined time period after the formation of the coated surface and before final drying for vaporizing the contained solvent which remains in the coated surface, the temperature environment having a temperature lower than that of the final drying and being capable of lowering a viscosity of the coating solution of the coated surface, thereby to uniformalize a film thickness of the coated surface.

In addition, it is allowed that the workpiece to-be-coated is a glass plate of a plasma display panel, and that at least a part of the coated surface is a barrier rib which is to be formed on the glass plate for the purpose of isolating discharge cells of the plasma display panel from one another.

In the case of forming the barrier rib, a film thickness of the coated surface may well be set at 150 [μm] thru 200 [μm] inclusive in terms of a value after drying.

In another typical aspect of performance of the present invention, the above objects are accomplished by a nozzle coating equipment comprising a workpiece bed which supports a workpiece with a planar surface to-be-coated of the workpiece looking upward, a liquid vessel which is filled with a coating solution and which is furnished with a nozzle at its lower end so as to discharge the coating solution from the nozzle under action of a pressure, and a drive system which supports the liquid vessel with the nozzle lying in downward proximity to the surface to-be-coated of the workpiece fixed to the workpiece bed and which drives at least either of the liquid vessel and the workpiece bed so as to move the nozzle relatively to the surface to-be-coated in parallel coating lines; the drive system including a control device which controls the relative movement in such a manner that a coating line of the coating solution to be discharged from the nozzle onto the surface to-be-coated and a coating line adjacent to the first-mentioned coating line overlap each other in a widthwise direction of the coating lines.

Herein, the drive system may well support the workpiece and the liquid vessel in such a manner that, during the relative movement between the workpiece and the liquid vessel, a gap which is formed between the surface to-be-coated and a tip of the nozzle becomes substantially equal to a desired film thickness of a layer coated by the nozzle.

Further, the drive system may well support the workpiece and the liquid vessel in such a manner that, during the relative movement between the workpiece and the liquid vessel, a gap which is formed between the surface to-be-coated and a tip of the nozzle becomes larger than a desired film thickness of a layer coated by the nozzle.

More further, the drive system may well support the workpiece and the liquid vessel in such a manner that, during the relative movement between the workpiece and the liquid vessel, a gap which is formed between the surface to-be-coated and a tip of the nozzle becomes smaller than a desired film thickness of a layer coated by the nozzle.

Further, a cross-sectional shape of a tip of the nozzle in the liquid vessel may well be any of a circle, an ellipse and a slit shape.

Still further, the liquid vessel may well be furnished with at least one other nozzle of the same type as that of the first-mentioned nozzle, and the plurality of nozzles are so arranged as to be spaced from each other in the widthwise direction of the coating lines.

Further, the nozzle and at least one other nozzle may well be so arranged that the plurality of nozzles are spaced at a predetermined interval which is integral times a widthwise pitch of the coating lines.

More further, the drive system may well be constructed so as to drive the plurality of nozzles synchronously.

Yet further, the drive system may well include an X-Y robot which supports the liquid vessel and moves the liquid vessel relatively to the workpiece.

Moreover, the drive system may well include an X-Y stage which moves a glass plate being the workpiece in X- and Y-directions along the surface to-be-coated, relatively to the liquid vessel.

DETAILED DESCRIPTION OF THE PREFERRED EMBODIMENT

Figure 1:
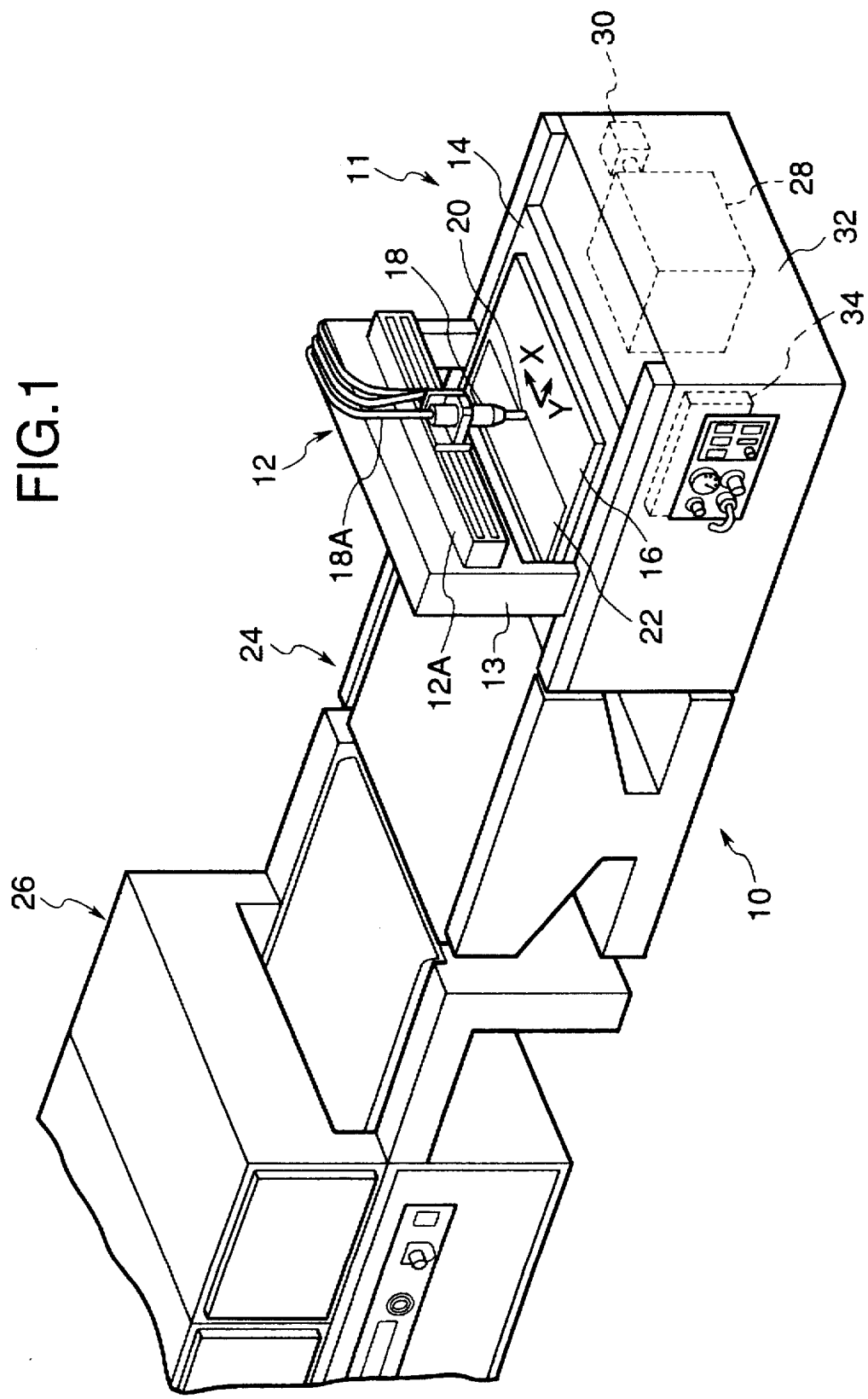
FIG. 1 is a perspective view showing a nozzle coating equipment according to an embodiment of the present invention.

Now, a nozzle coating equipment according to an embodiment of the present invention will be described in detail with reference to the drawings.

The nozzle coating equipment 10 in the embodiment of the present invention comprises a coating section 11, a carriage 24 and a drying section 26. The coating section 11 is so constructed and operated that, while a coating solution contained in a liquid vessel 18 called "dispenser" is being discharged from a nozzle 20 provided at the lower end of the liquid vessel 18, onto a glass plate 16 for a plasma display panel (abbreviated to "PDP") put on the horizontal support plate 14 of an X-Y robot 12, the liquid vessel 18 is driven in X- and Y-directions along the upper surface of the glass plate 16 by the X-Y robot 12. Thus, the upper surface of the glass plate 16 is coated with the coating solution so as to form a coated surface 22.

As seen from FIG. 1, the glass plate 16 formed with the coated surface 22 is transported via the carriage 24 to the drying section 26, in which it is dried to complete the coating.

The liquid vessel 18 is connected with a coating solution tank 28 through a flexible pipe 18A, and is supplied with the coating solution via a controller 30 from the coating solution tank 28.

The X-Y robot 12 is constructed including the support plate 14 which is free to reciprocate in the Y-direction on an underframe 32, and an X-directional driver 12A which is attached to a gate-shaped frame 13 arranged on the underframe 32 so as to stride over the support plate 14, and which is free to reciprocate in the X-direction while supporting the liquid vessel 18.

The controller 30, which serves for the movement of the support plate 14 in the Y-direction, the movement of the X-directional driver 12A in the X-direction and the supply of the coating solution, is controlled by a control device 34 which is disposed inside the underframe 32.

Figure 2:
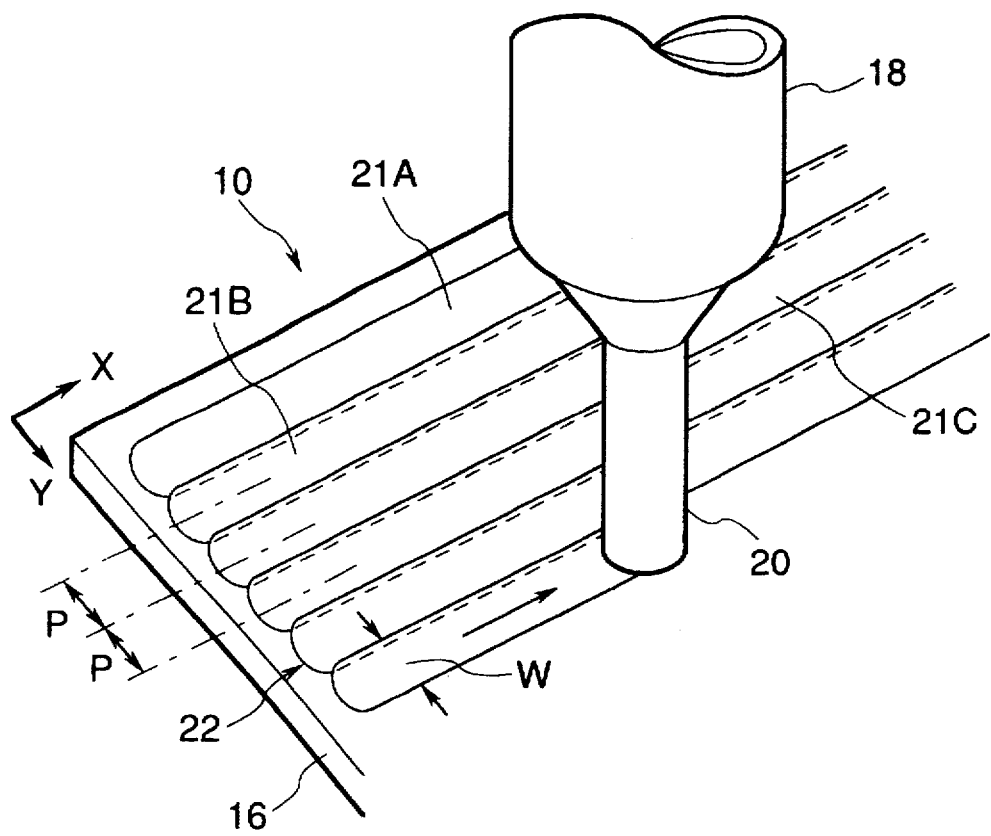
FIG. 2 is a perspective view showing the essential portions of the nozzle coating equipment on an enlarged scale.
Figure 3A:
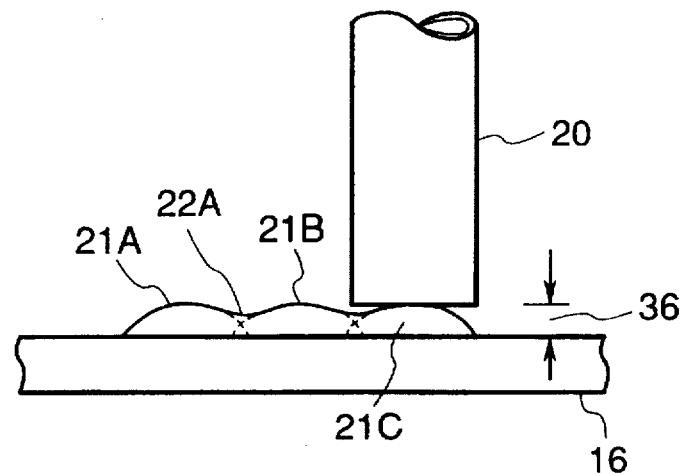
FIGS. 3A and 3B are a sectional side view and a plan view showing the relationship between a nozzle included in the nozzle coating equipment and coating lines, respectively.
Figure 3B:
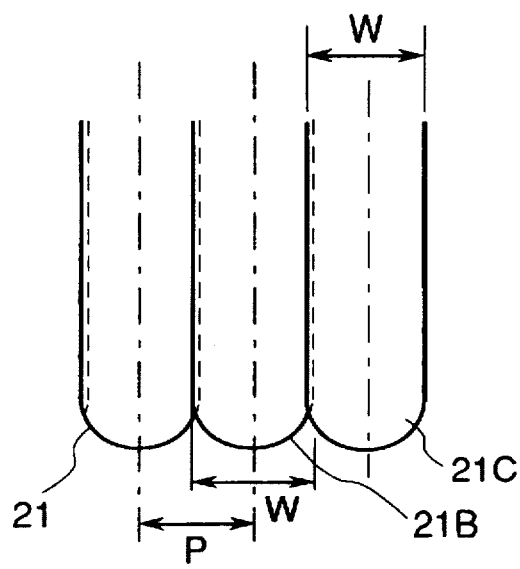

As shown in FIG. 2 and FIGS. 3A and 3B, the lower-end discharge port of the nozzle 20 is arranged in proximity to the upper surface of the glass plate 16, and the gap 36 between the discharge port and the upper surface is set so as to agree with the desired coating film thickness of the coated surface 22 which is formed by the coating with the coating solution.

In addition, the control device 34 controls the Y-directional feed of the support plate 14 and the X-directional feed of the X-directional driver 12A as stated below.

As shown in FIG. 2 and FIG. 3B by way of example, while the liquid vessel 18 (the nozzle 20) is being reciprocated in a straight line in the X-direction by the X-directional driver 12A, the support plate 14 is driven a predetermined pitch P in the Y-direction on one way of the reciprocation.

Here, the pitch P is set smaller than the width W of each coating line of the coating solution formed by the nozzle 20. Thus, one coating line 21 by the nozzle 20 is formed in a manner to overlap another coating line adjoining it in the Y-direction, in the widthwise direction of the coating lines.

Moreover, the widthwise pitch P of the coating lines 21 is determined depending upon the diameter of the discharge port of the nozzle 20, the discharge pressure of the coating solution at the discharge port, and the properties of the coating solution including a viscosity and a surface tension.

By way of example, conditions may be set as lo explained below. The coating solution is endowed with a viscosity of 40,000 [centipoises] by adjusting the quantity of addition of a solvent in a paste which is mainly composed of inorganic powder and a vehicle. The gap 36 between the lower end of the nozzle 20 and the upper surface of the glass plate 16 has a value of 230 [μm] which is equal to the desired film thickness of the coating film (230 [μm] before the drying). The tip of the nozzle 20 is in a circular shape which has an inside diameter of 2 [mm] and an outside diameter of 3 [mm]. The glass plate 16 is of 8-inch size. The moving rate of the nozzle 20 is 60 [mm/second] in the X-direction. The Y-directional pitch is P=1.6 [mm].

Accordingly, when the width of each coating line is set at W=2 [mm] (with the coating pitch P=1.6 [mm]), the magnitude of the widthwise overlap between the adjacent coating lines becomes 0.4 [mm].

Further, the control device 34 is so contrived that, when the support plate 14 is driven one pitch P in the Y-direction after one coating line 21 has been formed owing to the X-directional drive of the nozzle 20, the controller 30 cuts off the exertion of a pressure on the liquid vessel 18 so as to suspend the discharge of the coating solution from the nozzle 20.

Next, there will be described a process in which the coating solution is applied onto the glass plate 16 by the nozzle coating equipment 10.

First, the support plate 14 is driven to the position of the origin in the Y-direction, and the glass plate 16 is set on the support plate 14. Subsequently, while being supplied with the coating solution under pressure from the coating solution tank 28 through the controller 30, the liquid vessel 18 (the nozzle 20) is rectilinearly moved in the X-direction by the X-directional driver 12A. Thus, the first coating line 21A is formed. Incidentally, the pressure which is exerted on the liquid vessel 18 is 1 thru 3 [kgf/cm$^2$], and it is held constant during the formation of the coating line. The moving rate of the nozzle 20 in the X-direction, the width W of the coating line and the pitch P in the Y-direction are set as mentioned above.

When the formation of the first coating line 21A has ended, the discharge of the coating solution from the nozzle 20 is suspended. Therefore, the film thickness of the coated surface 22 is prevented from becoming greater at the terminating end of the coating line 21A than at any other part.

Subsequently, the support plate 14 is driven one pitch of 1.6 [mm] in the Y-direction. Thereafter, the nozzle 20 is driven in the sense opposite to that of the first coating line 21A by the X-directional driver 12A. The nozzle 20 thus driven to the initiating end of the second coating line 21B is moved in the X-direction similarly to the above, whereby the second coating line 21B is formed.

Owing to the iteration of the above operations, the coated surface 22 having an area of 200 [mm]×130 [mm] is deposited on the glass plate 16 of the 8-inch size by way of example.

The drying of the coated surface 22 in the drying section 26 proceeds as follows by way of example. First, the coated surface 22 is preliminarily dried at 120[° C.] for 20 thru 30 [minutes]. Subsequently, it is finally dried at 170[° C.] for 10 thru 20 [minutes].

In the case where the preliminary drying at the temperature lower than that of the final drying precedes the final drying in this manner, dents 22A having appeared at the widthwise overlap parts between the respectively adjacent ones of the first–third coating lines 21A–21C are smoothed out as shown in FIG. 3A by way of example. The smoothed state is fixed by the final drying which is performed after the preliminary drying.

If the final drying is performed from the beginning without the preliminary drying, there will arise the problem that the coated surface 22 subjected to the final drying is not leveled due to the fixation of the dents 22A or the appearance of cracks in the coated surface 22.

In an example, the glass plate 16 was coated with the coating solution and was dried under the conditions mentioned above. The surface roughness of the coated surface 22 in the example was measured by a surface roughness tester ("Tally-Surf"). Then, the flatness of the coated surface 22 was within 5 [μm] relative to the film thickness, 140 [μm] of the dried coated surface 22.

Figure 4:
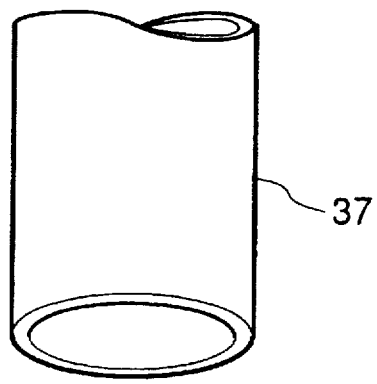
FIG. 4 is a perspective view showing a modified embodiment of a nozzle included in a nozzle coating equipment.
Figure 5:
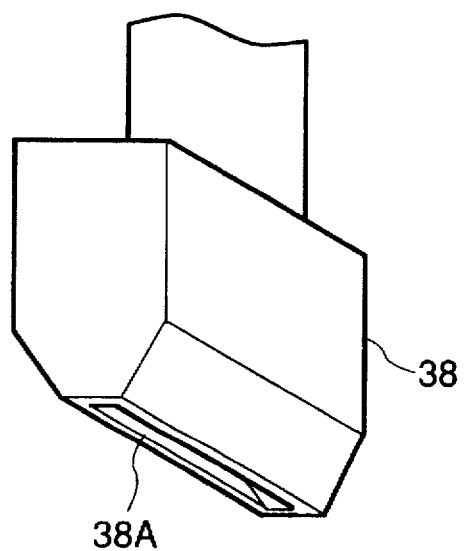
FIG. 5 is a perspective view showing another modification of a nozzle included in a nozzle coating equipment.
Figure 6:
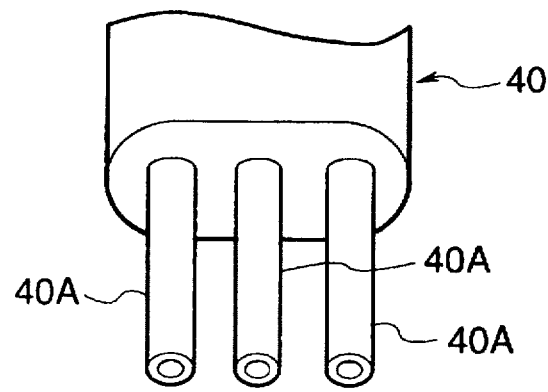
FIG. 6 is a perspective view showing still another modification of a nozzle included in a nozzle coating equipment.

The nozzle 20 in the nozzle coating equipment 10 described above has the discharge port whose cross-section is circular, but the present invention is not restricted to the exemplified nozzle 20. By way of example, the nozzle 20 may well be replaced with an elliptical nozzle 37 of elliptical cross-section as shown in FIG. 4, or with a slit-shaped nozzle 38 having a slit-like discharge port 38A as shown in FIG. 5. Alternatively, it is allowed to employ a multi-nozzle structure 40 including a plurality of component nozzles 40A as shown in FIG. 6, FIG. 7A or FIG. 7B.

Each of the elliptical nozzle 37 and the slit-shaped nozzle 38 widens the coating line 21, and therefore enhances the rate of the coating operation.

Figure 7A:
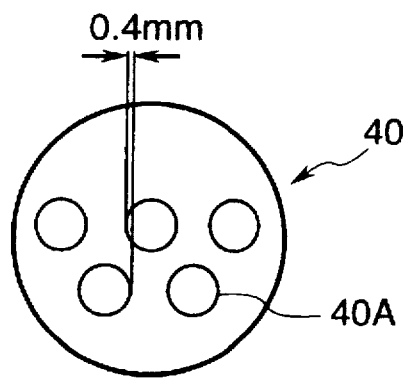
FIGS. 7A and 7B are bottom plan views each showing yet another modification of a nozzle included in a nozzle coating equipment.
Figure 7B:
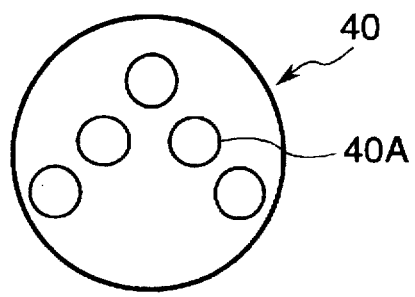

In the case of the multi-nozzle structure 40, the component nozzles 40A can be especially arranged as shown in FIG. 7A or FIG. 7B in order that, when the coating solution is discharged from the respective component nozzles 40A, a plurality of coating lines may be formed having a desired magnitude of overlap (for example, 0.4 [mm]). Thus, the multi-nozzle structure 40 can achieve the same effect as that of the elliptical nozzle 36 or the slit-shaped nozzle 38.

Figure 8:
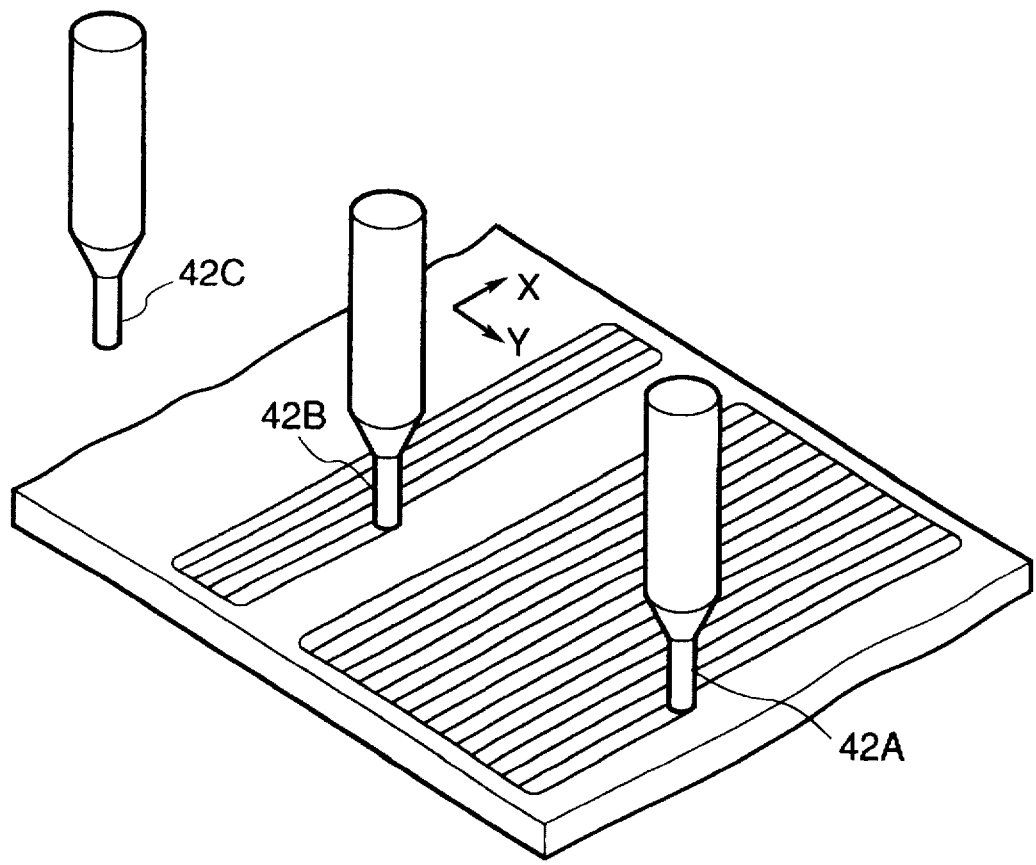
FIG. 8 is a perspective view showing a different example of arrangement of nozzles included in a nozzle coating equipment.

Further, the single nozzle or the single multi-nozzle structure in the nozzle coating equipment is not restrictive. As shown in FIG. 8, a plurality of nozzles may well be disposed in the Y-direction at regular intervals each of which is integral times the pitch P of the coating lines.

In this case, the Y-directional interval between the nth nozzle 42A precedent in the Y-direction and the succedent (n+1)th nozzle 42B, and the interval between the (n+2)th nozzle 42C and the (n+1)th nozzle 42B are integral times the Y-directional pitch P and are equal as explained above.

Besides, all the nozzles 42A–42C are driven synchronously or asynchronously in both the X-direction and the Y-direction. Herein, the drive is controlled by the control device 34 so that the coating line formed first by the nth nozzle 42A and the coating line formed last by the (n+1)th nozzle 42B may overlap each other in the widthwise direction of the coating lines, similarly to the coating lines shown in FIG. 2 and FIGS. 3A and 3B.

Also in the case of employing the plurality of nozzles 42A–42C, parts of the operation of coating the surface to-be-coated with the coating solution are respectively allotted to these nozzles, and hence, the rate of the coating operation can be enhanced.

Incidentally, the X-Y robot 12 included in the nozzle coating equipment 10 described before drives the support plate 14 in the Y-direction and drives the liquid vessel 18 in the X-direction through the X-directional driver 12A, whereby the predetermined region of the glass plate 16 is coated with the coating solution by the nozzle 20. The present invention, however, is not restricted to the exemplified robot 12. It is also allowed to fix the side of the support plate 14 and to drive the liquid vessel 18 in the X- and Y-directions, or to fix the liquid vessel 18 and to drive the side of the support plate 14 in the X- and Y-directions. Further, both the liquid vessel 18 and the support plate 14 may well be driven in the X- and Y-directions so as to coat the glass plate 16 with the coating solution.

Figure 9:
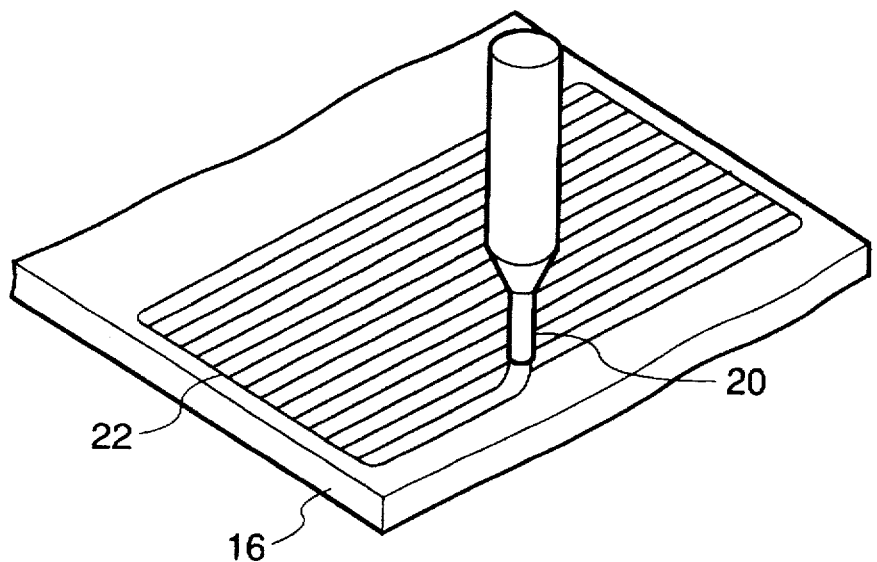
FIG. 9 is a perspective view showing a coating operation state in the case where the gap between a nozzle and a glass plate is set greater than the film thickness of a coated surface.

Besides, in the nozzle coating equipment 10 described before, the gap 36 between the tip of the nozzle 20 and the surface to-be-coated of the glass plate 16 is set equal to the desired film (not dried) thickness of the coated surface 22. The present invention, however, is not restricted to the exemplified gap 36. As illustrated in FIG. 9, the tip of the nozzle 20 may well be spaced more than the desired film thickness from the glass plate 16, so as to form the coating lines by the use of the coating solution which dangles in the shape of a thread from the nozzle 20.

Figure 10:
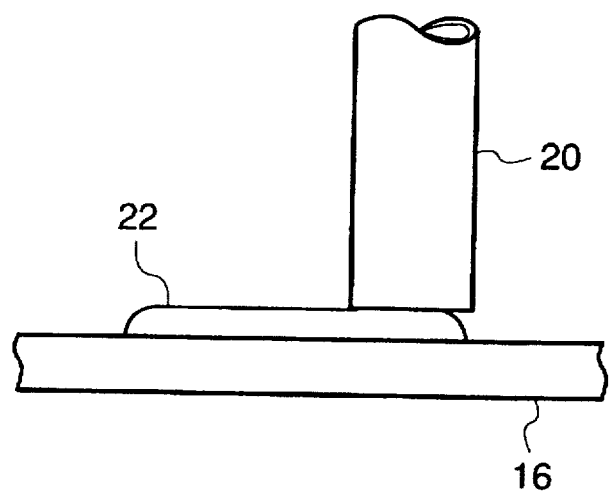
FIG. 10 is a sectional side view showing a coating operation state in the case where the gap between a nozzle and a glass plate is set less than the film thickness of a coated surface.

To the contrary, as illustrated in FIG. 10, the spacing between the nozzle 20 and the glass plate 16 may well be set less than the desired film thickness of the coated surface 22 so as to coat the glass plate 16 with the coating solution.

In this case, the surface of the layer of the coating solution discharged onto the glass plate 16 from the tip of the nozzle 20 is stirred in the X-direction.

Therefore, the dents 22A between the respectively adjacent coating lines 21 as shown in FIG. 2 and FIGS. 3A and 3B are moderated. Accordingly, the surface ruggedness of the coated surface 22 becomes smaller.

Further, in the nozzle coating equipment 10 described before, the whole surface of the glass plate 16 for the plasma display panel is formed by so-called "allover coating" with a barrier rib forming layer on the basis of which the barrier rib of the PDP is formed. However, this aspect of the coating operation is not restrictive, but only the predetermined region of the glass plate 16 can be coated with the coating solution by controlling the nozzle 20 and the support plate 14 in the X- and Y-directions by means of the control device 34. That is, the patterning of the coated surface is possible.

With such a measure, the unnecessary parts of the barrier rib forming layer after the baking thereof may be removed in a smaller area. Moreover, the coating lines can be directly used as the barrier rib in some cases by making the diameter of the hole of the nozzle 20 smaller and enhancing the precisions of the movements in the X- and Y-directions.

Besides, in the foregoing embodiment, the nozzle 20 is moved along the rectilinear coating lines. However, the present invention is not restricted to the exemplified operation, but it shall also cover a case where a workpiece to-be-coated is coated with the coating solution along coating lines in the shape of a curve such as a circular arc or a spiral by controlling the nozzle 20 and the support plate 14 in the X- and Y-directions by means of the control device 34.

Further, the present invention is not utilized only for the formation of the barrier rib of the plasma display panel, but it can be utilized also for the formation of thick film patterns in processes for manufacturing a liquid-crystal display device, a phosphorescent display device, a hybrid integrated circuit, etc.

What is claimed is:

1. A nozzle coating method comprising the step of coating a planar surface to-be-coated of a workpiece with a coating solution in parallel coating lines in such a way that a nozzle is moved relatively to and in parallel with the surface to-be-coated while the coating solution is being discharged from a tip of the nozzle in a state in which the nozzle tip is spaced from the surface to-be-coated, the step of iteratively coating the surface to-be-coated in succession in such a manner that a next coating line in a widthwise direction thereof overlaps the previous coating line in the widthwise direction, thereby to form a coated surface, and a gap between the surface to-be-coated and the nozzle tip is set substantially equal to or smaller than a desired film thickness of the coated thickness, thereby to stir the surface of the layer of the coating solution by the nozzle tip.

2. A nozzle coating method as defined in claim 1, wherein the discharge of the coating solution from the nozzle tip is suspended while the nozzle is shifted from a terminating end of a certain one of the coating lines to an initiating end of a next one of the coating lines.

3. A nozzle coating method as defined in claim 1, wherein a widthwise pitch of the coating lines is set depending upon a diameter of a discharge port of the nozzle, a discharge pressure of the coating solution at the discharge port, and properties of the coating solution including a viscosity and a surface tension.

4. A nozzle coating method as defined in claim 1, wherein the nozzle and at least one other nozzle are so arranged that the plurality of nozzles are spaced at a predetermined interval which is integral times a widthwise pitch of the coating lines, in the widthwise direction of the coating lines, and the surface to-be-coated is coated by moving the individual nozzles relatively thereto in such a manner that a first one of the coating lines based on a certain one of the individual nozzles and a last one of the coating lines based on another of the individual nozzles adjoining the certain nozzle rearward of the certain nozzle in the widthwise pitch feed direction thereof overlap each other in the widthwise direction.

5. A nozzle coating method as defined in claim 1, wherein the coating solution contains a solvent, and the coated surface is let stand in a temperature environment for a predetermined time period after the formation of the coated surface and before final drying for vaporizing the contained solvent which remains in the coated surface, the temperature environment having a temperature lower than that of the final drying and being capable of lowering a viscosity of the coating solution of the coated surface, thereby to uniformalize a film thickness of the coated surface.

6. A nozzle coating method as defined in claim 1, wherein the workpiece to-be-coated is a glass plate of a plasma display panel, and at least a part of the coated surface is a barrier rib which is to be formed on the glass plate for the purpose of isolating discharge cells of the plasma display panel from one another.

7. A nozzle coating method as defined in claim 6, wherein a film thickness of the coated surface is set at 150 [μm] thru 200 [μm] inclusive in terms of a value after drying.

* * * * *